United States Patent [19]

Sadler

[11] 4,382,969
[45] May 10, 1983

[54] METHOD FOR TREATING CHEESE

[75] Inventor: Frederick J. Sadler, Auckland, New Zealand

[73] Assignees: Schreiber Foods, Inc., Green Bay, Wis.; Butland Industries, Ltd., Auckland, New Zealand

[21] Appl. No.: 252,458

[22] Filed: Apr. 9, 1981

[30] Foreign Application Priority Data

Apr. 18, 1980 [NZ] New Zealand .......................... 193481

[51] Int. Cl.³ ...................... A23C 19/00; B30B 11/26; A01J 25/13; A01J 25/15

[52] U.S. Cl. ...................................... 426/272; 99/454; 100/39; 100/97; 100/98 R; 425/197; 425/297; 425/405 R; 426/486; 426/512; 426/516; 426/518

[58] Field of Search ............... 426/272, 273, 512, 516, 426/517, 518, 388, 582, 486; 99/454; 100/39, 98 R, 94, 97; 425/197, 296, 311, 405 R, DIG. 60

[56] References Cited

U.S. PATENT DOCUMENTS

| | | | |
|---|---|---|---|
| 1,323,869 | 12/1919 | Kraft | 426/512 |
| 1,492,388 | 4/1924 | Popper | 426/512 |
| 1,522,383 | 1/1925 | Parsons et al. | 426/518 |
| 2,009,238 | 7/1935 | Parsons | 426/518 |
| 2,794,746 | 6/1957 | Schwartz | 426/512 |
| 2,872,324 | 2/1959 | Locatelli | 426/582 |
| 3,238,046 | 3/1966 | Komarik | 426/272 |
| 3,468,026 | 9/1969 | Robertson et al. | |
| 3,562,910 | 2/1971 | Runge et al. | 426/512 |
| 3,615,587 | 10/1971 | Koopmans | |
| 3,727,308 | 4/1973 | Ross | 426/273 |
| 3,829,594 | 8/1974 | Schweizer | 426/517 |
| 3,903,315 | 9/1975 | Giles et al. | 426/272 |
| 3,906,118 | 9/1975 | McFarland | 426/518 |
| 4,039,695 | 8/1977 | Johnson | 426/512 |
| 4,078,874 | 3/1978 | Lenhardt | 426/516 |
| 4,185,126 | 1/1980 | Spors | 426/272 |
| 4,260,640 | 4/1981 | Hartmann et al. | 426/516 |

FOREIGN PATENT DOCUMENTS

| | | |
|---|---|---|
| 22264 | 4/1935 | Australia ........................... 426/512 |
| 1187964 | 4/1970 | United Kingdom . |
| 1280999 | 7/1972 | United Kingdom . |
| 1285162 | 8/1972 | United Kingdom . |
| 1471748 | 4/1977 | United Kingdom . |
| 1542844 | 3/1979 | United Kingdom . |
| 2055035 | 2/1981 | United Kingdom . |
| WO79/00837 | 10/1979 | World Intel. Prop. Org. . |

*Primary Examiner*—Steven L. Weinstein
*Attorney, Agent, or Firm*—Hume, Clement, Brinks, Willian & Olds, Ltd.

[57] ABSTRACT

A method is disclosed for treating cheese, preferably cheese offcuts, to form a reconstituted block of cheese. The offcuts are first cut into small chips and then re-pressed in an evacuated environment to form the reconstituted block of cheese which may then be cut to commercially saleable sizes and packaged.

8 Claims, 4 Drawing Figures

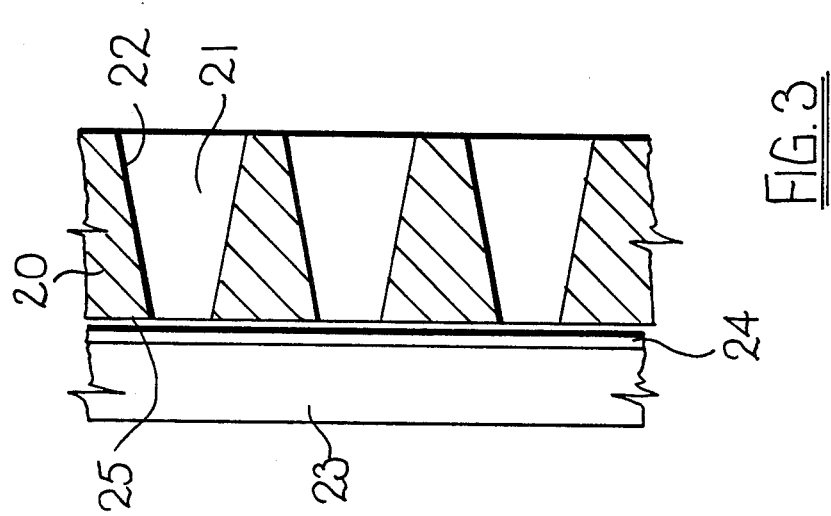
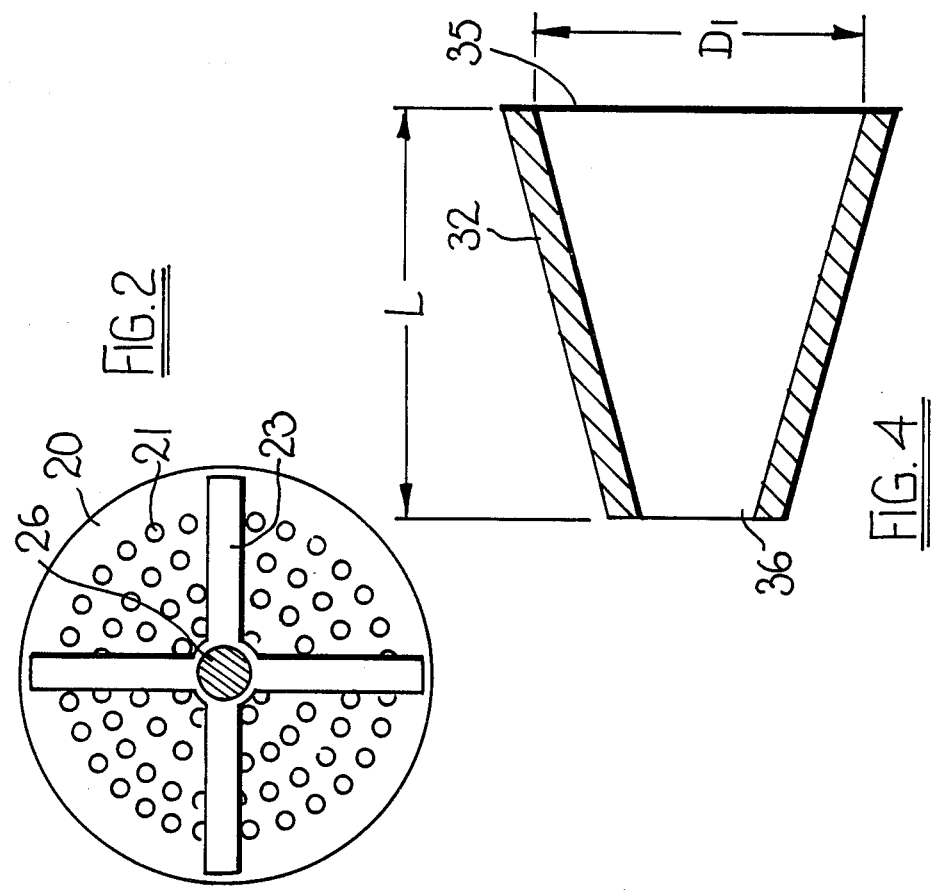

METHOD FOR TREATING CHEESE

This invention relates to methods of and/or apparatus for treating cheese and has been devised particularly though not necessarily solely for use in the pressing of cheese off cuts, resulting from cutting blocks of cheese into retail size blocks, into a reconstituted larger block.

Various forms of method and apparatus have been proposed in the past for recutting cheese off-cuts into chips and pressing the chips to form a homogeneous block of cheese.

U.S. Pat. No. 4,185,126 describes a method in which cheese off-cuts or trimmings are ground into small particles while being held at a temperature of between 42° to 55° F. and then compressed into a closed mould and held at compaction pressure of between 60 to 90 psi for one to two hours. This has the effect of producing a solid, self supporting homogeneous cheese block which can subsequently be cut to commercially saleable sizes.

It will be appreciated however, that the grinding of the trimmings results in considerable "working" of the cheese which can alter the physical characteristics thereof and further the process is slow since it involves the compaction of the ground particles into a closed mould.

One form of apparatus for continuously reconstituting cheese off-cuts is described in U.S. Pat. No. 3,727,308.

In this patent apparatus is described which incorporates a helical feed auger to press the off-cuts through a perforated plate to produce small chips which are then compressed through a converging nozzle. A heating coil is provided around the nozzle to encourage some oil to bleed from the chips, thus lubricating the walls of the nozzle and enhancing flow of the product.

It is believed that the apparatus described in U.S. Pat. No. 3,727,308 has several drawbacks in that the displacement of the trimmings using a helical auger results in considerable working of the cheese which can detract from the characteristics of the end product. These characteristics are further altered by the application of heat in the exit nozzle.

It is an object of the present invention to provide apparatus for and/or a method of processing cheese off-cuts which will go at least some way in overcoming the disadvantages of the prior art which will at least provide the public with a useful choice.

It is a further object of the invention to provide apparatus for and/or a method of processing cheese cut-offs into a reconstructed block having substantially the same characteristics as the off-cuts.

Accordingly in one aspect the invention consists in a method of treating cheese, said method comprising the steps of feeding cheese to a comminuting means and then pressing the resultant comminuted pieces in an evacuated environment, in a manner such that there is bonding or agglomeration between adjacent comminuted pieces of cheese to form a reconstituted block of cheese.

In a further aspect the invention consists in apparatus for treating cheese; said apparatus comprising means to receive cheese; comminuting means for comminuting said cheese into small comminuted pieces; and press means situated at least partially in an evacuated environment, said press means being arranged to press the comminuted pieces in an evacuated environment in a manner such that said pieces bond or agglomerate to form a reconstituted block of cheese.

To those skilled in the art to which this invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

One preferred form of the invention will now be described with reference to the accompanying drawings in which:

FIG. 2 shows a part elevational view of part of the comminuting means incorporated in the apparatus depicted in FIG. 1;

FIG. 3 shows a sectional view enlarged still further, of part of the comminuting means shown in FIG. 2; and FIG. 4 shows a schematic sectional view of an extrusion nozzle for use in the apparatus according to the invention.

Figure 1:
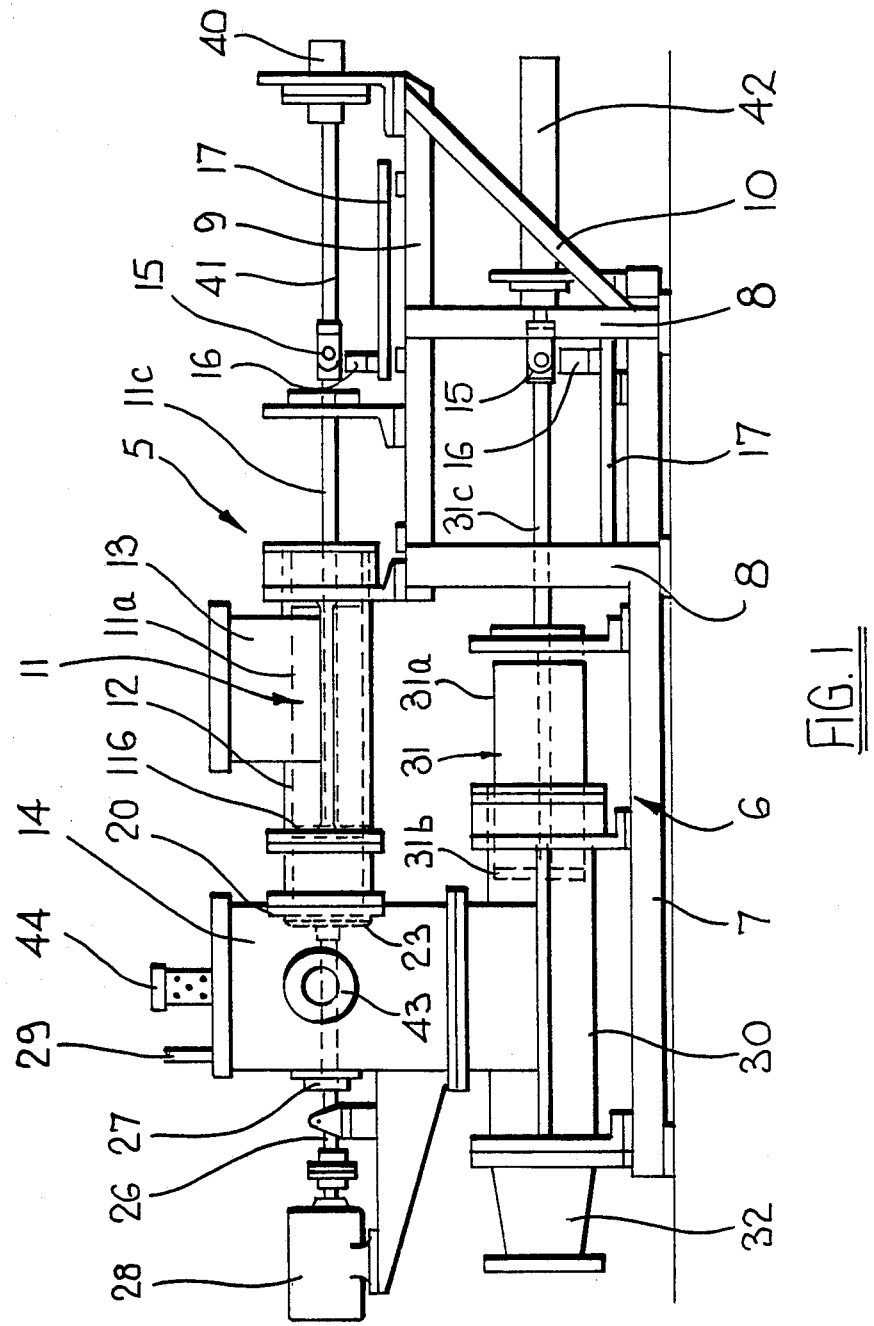
FIG. 1 shows an elevational view of apparatus according to the invention.

Referring to the drawings, according to the invention, apparatus 5 is provided for treating off-cuts of cheese so as to recombine the off-cuts into a block which has substantially the same, or closely similar characteristics to the blocks of cheese from which the off-cuts are taken.

The apparatus 5 includes a support frame such as shown and generally designated 6 comprising a base 7, plurality of up-rights 8, an upper sub-frame 9 and diagonal bracing 10 to brace the upper sub-frame 9 with respect to the base 7.

Mounted on the upper sub-frame 9 of the base frame 6 is a first or feed ram assembly 11 which is constructed, arranged and operable to displace cheese off-cuts (not shown), loaded into ram chamber 12 through feed hopper 13, through comminuting means which will be hereinafter described, located in chamber 14.

The feed ram assembly 11 (shown partially in phantom view) comprises a hollow cylindrical ram piston 11a movable longitudinally in the cylindrical ram chamber 12 and having a circular ram head 11b connected to a ram rod 11c. The feed ram assembly 11 driven by a conventional hydraulic piston and cylinder assembly 40 which includes piston rod 41 connected to the ram rod 11c. An anti-rotation device 15 attached to piston rod 11a and comprising a plate member 16 sliding in longitudinal guides 17 may be provided to prevent rotation of the ram head in the chamber 12, however this is not an essential component of the apparatus.

The feed hopper 13 comprises a simple, open-topped, rectangular hopper merging into the upper surface of the ram chamber 12, the hopper 13 being positioned so that when the ram head 11b is fully withdrawn it lies to the right of the hopper 13 in FIG. 1.

The comminuting means may be better understood with reference to FIGS. 2 and 3 and comprises an apertured plate 20 having apertures 21 therein, provided at the downstream end of the press chamber 12 so that upon compression of the cheese off-cuts by the ram assembly 11, the off-cuts are forced through the apertures 21. As can be better seen from FIG. 3 each of the apertures 21 are tapered 22 from the entry side thereof. The open entry area formed by the apertures 21 on the upstream side of the apertured plate 20 is greater than the remaining surface area of the upstream side of the apertured plate 20 and preferably occupies at least 75% to 80% of the total surface area of the upstream side of the apertured plate 20. The purpose of the tapered entry will be described hereinafter.

The comminuting means further includes cutting means 23 which, as shown, comprises a four bladed cutter which is rotatably mounted so that the cutting edges 24 of the blades pass over the outlet surface 25 of the apertured plate 20. The cutting means 23 is, as shown, mounted on a shaft 26 mounted in suitable bearings 27 and powered by an electric or hydraulic motor 28. We have found that optimum cutting results when the cutting means is positioned about 0.254 mm from the plate 20.

It will be appreciated that the combination of the feed ram assembly 11 and the perforated plate 20 in combination with the rotating/cutting means 23 produces a plurality of comminuted cheese pieces, the diameter of which is determined by the diameter of the apertures 21 and the length of which is determined by the rotational speed of the cutting means 23 and the longitudinal speed of feed ram head 11b. If any adjustment in the length of the chips is required this may be accomplished by adjusting the speed of the cutting means 23 or the speed of the ram head 11b. The speed of advance of ram head 11b may be effected by adustment of suitable flow control valves disposed in the hydraulic lines supplying the driving cylinder 40. If motor 28 is hydraulic suitable flow control valves disposed in the hydraulic lines to the motor may be used to effect adjustment of motor speed.

The apertures 21 are preferably sized to produce cheese pieces of a diameter in the range of 6.25 mm to 25 mm while the speeds of ram 11 and the motor 28 are preferably adjusted to provide pieces of length in the range of 0.25 mm to 3.17 mm delivered into chamber 14. A viewing port 43 is preferably provided in a sidewall of the chamber 14, and a lamp fixture 44 is preferably provided to illuminate the interior of the chamber 14.

From the comminuting means the comminuted chips fall under gravity into a cylindrical press ram chamber 30. A press ram assembly 31 (shown partly in phantom view) of structure similar to the feed ram assembly 11 operates within the press chamber 30. The press ram assembly comprises a hollow cylindrical ram piston 31a movable longitudinally in the cylindrical press ram chamber 30 and having a circular ram head 31b connected to a ram rod 31. A conventional hydraulic piston and cylinder assembly 42 displaces ram head 31b of press ram assembly 31 longitudinally within cylindrical press ram chamber 30 to compress the comminuting chips through a tapered nozzle 32 from which the comminuted chips emerge in the form of a homogeneous block which can be cut to commercial sizes and sold.

The chamber 4 containing the apertured plate 20 and cutting means 23, and the press ram chamber 30 are both evacuated by means of a suitable vacuum pump (not shown) connected to port. We believe the vacuum assists in deaerating the comminuted chips so that when pressure is exerted by the ram 31 the individual chips loose their separate structure and "memory" thus forming a homogeneous final product. Suitable conventional baffling or screening is preferably provided at the vacuum port 29 entrance to prevent comminuted cheese pieces from entering the port 29.

The nozzle 32 is preferably dimensioned so that the inlet side 35 thereof is defined by a substantially circular aperture of diameter $D_1$ while the exit 36 thereof is defined by substantially rectangular aperture. In the form shown the nozzle 32 undergoes a reduction in area of approximately 63% over the length thereof, the length in the embodiment shown being in the order of 4.5 times the inlet diameter.

We have found that satisfactory results are achieved by selecting the various components to give the following parameters:

1. The respective piston and cylinder drive assemblies 40 and 42 are selected to work on an adjustable operating pressure between 600 and 1200 psi, the preferred working pressure being 900 psi with the ram structures 11 and 31 being sized to each exert a preferred pressure on the cheese of 100 psi.
2. The speed of advance of both rams 11 and 31 is preferably in the order of 100 mm per second.
3. The vacuum in chambers 24 and 30 is set to at least 635 mm Hg.
4. The operating speed of motor 28 is in the order of 1420 psi.

In addition to the sizing of the various mechanical components the temperature is preferably controlled so that the cheese undergoing processing remains in the range of 8° C. to 12° C. This not only assists in maintaining the optimum physical characteristics in the finished product but also inhibits the growth of bacteria during processing. This temperature control is achieved by controlling the ambient temperature and further, if necessary, including a cooling jacket around the nozzle 32.

The apparatus has been developed particularly to minimise mechanical working of the cheese during processing which can alter the physical characteristics thereof. Accordingly linear compression means in the form of hydraulic rams 11 and 31 are provided to compress and feed the cheese off-cuts and to feed the subsequent comminuted chips in preference to auger type devices which would unnecessarily work the cheese. For the same reason the walls 22 of the apertures 20 are tapered and the chips are subsequently formed by cutting means rather than grinding means which would further unnecessarily work the cheese.

For these reasons the product emerging from the nozzle 32, in the preferred embodiment described herein, has substantially the same characteristics as the off cuts passed through the feed hopper 13.

To begin use the rams 11 and 31 are fully retracted to the right when viewed as in FIG. 1, an evacuating source supplied to port 29 and the motor 28 actuated to drive the cutting means 23.

Cheese off-cuts are then fed into feed hopper 13 and the piston and cylinder assembly 40 actuated to advance the feed ram 11 to press the off-cuts to the left in FIG. 1 and through the apertured plate 20 whereupon the rotating cutters 23 chop the cheese into small chips of the sizes mentioned above. The chips fall into the delivery chamber 30. Upon retraction of the feed ram 11 (which may be sensed by a limit switch or other conventional sensing means) the piston and cylinder assembly 42 is actuated to advance the press ram 31 to compress the chips through the nozzle 32 whereupon the combination of vacuum which serves to de-aerate the chips and the pressure exerted by the convergence of nozzle 32 and the feed ram 31 produce a product which is substantially homogeneous, retains none of the physical characteristics of the individual chips and is of substantially the same characteristics as the original off-cuts. Upon retraction of the delivery ram 31, the cycle described is again ready to be repeated. It should be noted that during the first cycle, a plate is preferably placed against the outlet orifice of the nozzle 32 in order to hold the vacuum in chambers 14 and 30 until the press ram 31 has sufficiently filled the nozzle 32 with cheese to prevent vacuum leakage.

Accordingly the invention provides apparatus for treating cheese and a method of treating cheese which at least in the preferred embodiment described combines the attributes achieved by linear compression of the comminuted cheese off-cuts i.e. low "working" of the cheese, combined with pressing, the comminuted off-cuts in an evacuated environment. Accordingly the cheese off-cuts are de-aerated and compressed with a minimum of working and thus a product is formed having substantially the same characteristics as the off-cuts from which the product is formed.

What is claimed is:

1. A method for treating cheese, said method comprising the steps of:

feeding said cheese into a first chamber;

linearly compressing said cheese under force with a first ram in said first chamber against an apertured plate so as to force said cheese through apertures in said plate;

in a second chamber, passing cutting means over the exit surface of said apertured plate so as to comminute said cheese at it emerges from said apertures into said second chamber into thin chips greater in diameter than in length, and accumulating said comminuted chips of cheese into a third chamber while maintaining a vacuum in said second and third chambers, and;

with a second ram, linearly advancing said chips of cheese accumulated in said third chamber under compressive force into and through a converging nozzle such that adjacent comminuted chips of cheese are bonded and agglomerated to form a substantially homogeneous cheese mass emerging from said nozzle.

2. The method of treating cheese as claimed in claim 1 wherein said apertures are sized to produce cheese chips of a diameter in the range of 6.25 mm to 25 mm while the speeds of said first ram and said cutting means are adjusted to provide cheese chips of length in the range 0.25 mm to 3.17 mm.

3. The method of treating cheese as claimed in claim 1 wherein said cheese while undergoing processing is maintained at a temperature in the range of 8° C. to 12° C.

4. The method of treating cheese as claimed in claim 1 wherein said first and second rams exert a pressure of approximately 100 p.s.i. on the cheese.

5. The method of treating cheese as claimed in claim 1 wherein said vacuum in said second and third chamber is set to at least 635 mm Hg.

6. The method of treating cheese as claimed in claim 1 wherein said cutting means are rotated over the surface of said plate.

7. The method of treating cheese as claimed in claim 1 wherein upon retraction of said first ram, said second ram is advanced, and upon retraction of said second ram, the method cycle is ready to be repeated.

8. The method of treating cheese as claimed in claim 1 wherein said first and second rams are advanced a speed of approximately 100 mm per second.

* * * * *

UNITED STATES PATENT AND TRADEMARK OFFICE
CERTIFICATE OF CORRECTION

PATENT NO. : 4,382,969

DATED : May 10, 1983

INVENTOR(S) : Frederick J. Sadler

It is certified that error appears in the above-identified patent and that said Letters Patent is hereby corrected as shown below:

In the Abstract, line 3, please delete "offcuts" and substitute therefore --off-cuts--;
Column 1, line 7, please delete "off cuts" and substitute therefor --off-cuts--;
Column 1, line 48, please delete "art which" and substitute therefor --art or which--;
Column 1, line 51, please delete "cut-offs" and substitute therefor --off-cuts--;
Column 3, line 62, please delete "deaerating" and substitute therefor -de-aerating--;
Column 4, line 34, please delete "minimise" and substitute therefor --minimize--;
Column 4, line 48, please delete "off cuts" and substitute therefor --off-cuts--;
Column 6, line 34, please delete "advanced a" and substitute therefor --advanced at a--;

Signed and Sealed this

Twenty-seventh Day of March 1984

[SEAL]

Attest:

GERALD J. MOSSINGHOFF

Attesting Officer

Commissioner of Patents and Trademarks